United States Patent [19]

Midorikawa et al.

[11] Patent Number: 5,454,706
[45] Date of Patent: Oct. 3, 1995

[54] APPARATUS FOR INJECTION-MOLDING RESIN FRAME AROUND GLASS SHEET EDGES

[75] Inventors: Fumiaki Midorikawa; Minole Yokota; Koji Takahashi, all of Osaka, Japan

[73] Assignee: Nippon Sheet Glass Co., Ltd., Osaka, Japan

[21] Appl. No.: 250,836

[22] Filed: May 31, 1994

[30] Foreign Application Priority Data

May 28, 1993 [JP] Japan ................ 5-028223

[51] Int. Cl.⁶ .................. B29C 45/14; B29C 45/37
[52] U.S. Cl. .................. 425/116; 425/542; 425/DIG. 47; 249/91; 249/95; 264/275
[58] Field of Search .................. 249/91, 95; 425/116, 425/542, DIG. 47; 264/275

[56] References Cited

U.S. PATENT DOCUMENTS

| | | | |
|---|---|---|---|
| 4,336,009 | 6/1982 | Wolf | 425/116 |
| 4,405,083 | 9/1983 | Charlebois et al. | 249/95 |
| 4,561,625 | 12/1985 | Weaver | 425/116 |
| 4,915,395 | 4/1990 | Barteck | 249/95 |
| 4,925,151 | 5/1990 | Gray | 425/DIG. 47 |
| 5,061,429 | 10/1991 | Yoshihara et al. | 425/116 |
| 5,108,687 | 4/1992 | Jourguin et al. | 249/95 |
| 5,196,210 | 3/1993 | Yoshihara et al. | 425/116 |
| 5,268,183 | 12/1993 | Garza | 425/116 |
| 5,330,339 | 7/1994 | Gatarz et al. | 249/95 |

FOREIGN PATENT DOCUMENTS

| | | |
|---|---|---|
| 56-171213 | 12/1981 | Japan . |
| 2-50318 | 4/1990 | Japan . |
| 4-7978 | 2/1992 | Japan . |
| 4-7982 | 2/1992 | Japan . |

*Primary Examiner*—Khanh P. Nguyen
*Attorney, Agent, or Firm*—Merchant, Gould, Smith Edell, Welter & Schmidt

[57] ABSTRACT

A resin frame such as a gasket or seal is injection-molded around the peripheral edges of a glass sheet which are positioned in a mold cavity which is defined between upper and lower molds that are brought together. Portions of the glass sheet which are spaced from the peripheral edges toward the geometric center of the glass sheet are gripped by a pair of resilient seal members mounted on the molds, respectively. A pair of protective walls is mounted on the molds, respectively, and held against surfaces of the resilient seal members which are closer to the mold cavity. The protective walls have respective distal ends spaced by a distance ranging from 0.01 mm to 0.1 mm from surfaces of the glass sheet when the molds are brought together.

8 Claims, 2 Drawing Sheets

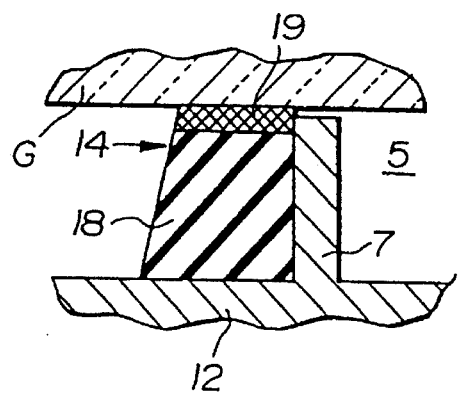
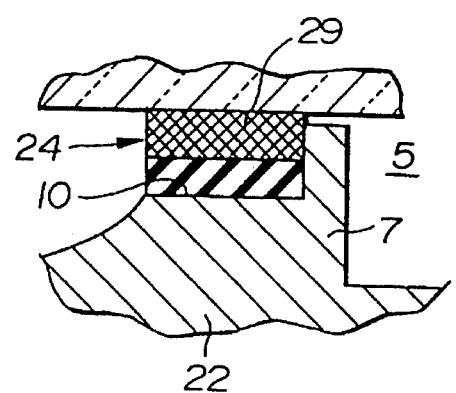
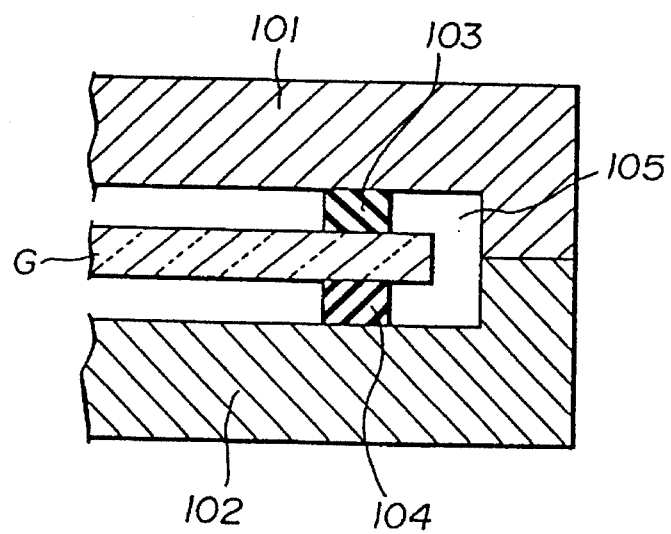
FIG. 4 (PRIOR ART)

APPARATUS FOR INJECTION-MOLDING RESIN FRAME AROUND GLASS SHEET EDGES

BACKGROUND OF THE INVENTION

1. Field of the Invention

The present invention relates to an apparatus for injection-molding a resin frame such as a resin molding, gasket, or seal around a peripheral edge of a glass sheet.

2. Description of the Prior Art

Resin frames are injection-molded as seals or gaskets around peripheral edges of glass sheets such as automobile front windshields. Conventional apparatus for injection-molding such resin frames are disclosed in Japanese laid-open utility model publications Nos. 56-171213 and 2-50318 and Japanese patent publications Nos. 4-7978 and 47982.

FIG. 4 of the accompanying drawings schematically shows one such conventional injection-molding apparatus which is disclosed typically in the latter two publications. As shown in FIG. 4, the conventional injection-molding apparatus has a pair of upper and lower molds 101, 102 for placing a glass sheet G therein, the upper and lower molds 101, 102 having respective seal members 103, 104 such as of an elastomeric resin. In operation, a portion of the glass sheet G which is spaced slightly inwardly from the peripheral edge thereof is gripped by the seal members 103, 104, and a resin material is injected into a mold cavity 105 which is defined around the peripheral edge of the glass sheet G between the upper and lower molds 101, 102 and the seal members 103, 104.

The conventional injection-molding apparatus is disadvantageous in that the seal members 103, 104 deteriorate soon and hence are deformed and become poor in their sealing capability quickly because the resin material is brought into direct contact with the seal members 103, 104 at high temperature and under high pressure.

SUMMARY OF THE INVENTION

It is therefore an object of the present invention to provide an apparatus for injection-molding a resin frame around a peripheral edge of a glass sheet without causing damage to resilient seal members on molds and damaging the glass sheet.

According to the present invention, there is provided an apparatus for injection-molding a resin frame around a peripheral edge of a glass sheet, comprising a pair of molds relatively movable toward and away from each other, said molds jointly defining a mold cavity when the molds are brought together, for accommodating a peripheral edge of a glass sheet therein, a pair of resilient seal members mounted on said molds, respectively, for sealingly engaging a portion of the glass sheet which is spaced from the peripheral edge thereof, and a pair of protective walls mounted on said molds, respectively, and having respective distal ends spaced by a distance ranging from 0.01 mm to 0.1 mm from surfaces of the glass sheet when the molds are brought together.

According to the present invention, there is also provided an apparatus for injection-molding a resin frame around a peripheral edge of a glass sheet, comprising a pair of molds relatively movable toward each other to define a mold cavity therebetween for accommodating a peripheral edge of a glass sheet therein, a pair of resilient seal members mounted on said molds, respectively, for gripping a portion of the glass sheet which is spaced from the peripheral edge toward the geometric center of the glass sheet, and a pair of protective walls mounted on said molds, respectively, and held against surfaces of said resilient seal members which are closer to said mold cavity, said protective walls having respective distal ends spaced by a distance ranging from 0.01 mm to 0.1 mm from surfaces of the glass sheet when the molds are brought together.

Preferably, each of said resilient seal members comprises an elastomeric core and a heat-resistant layer mounted on at least a surface of said elastomeric core which will be in contact with the glass sheet when said molds are brought together. The heat-resistant layer may cover all surfaces of said elastomeric core.

Each of said resilient seal members preferably comprises an adhesive layer and a heat-resistant layer mounted on a surface of said adhesive layer which will be in contact with the glass sheet when said molds are brought together.

The above and further objects, details and advantages of the present invention will become apparent from the following detailed description of preferred embodiments thereof, when read in conjunction with the accompanying drawings.

BRIEF DESCRIPTION OF THE DRAWINGS

FIG. 3A is an enlarged cross-sectional view of a resilient seal member according to another embodiment of the present invention;

FIG. 3B is an enlarged cross-sectional view of a resilient seal member according to still another embodiment of the present invention; and FIG. 4 is a cross-sectional view of a conventional injection-molding apparatus.

DETAILED DESCRIPTION OF THE PREFERRED EMBODIMENTS

Figure 1:
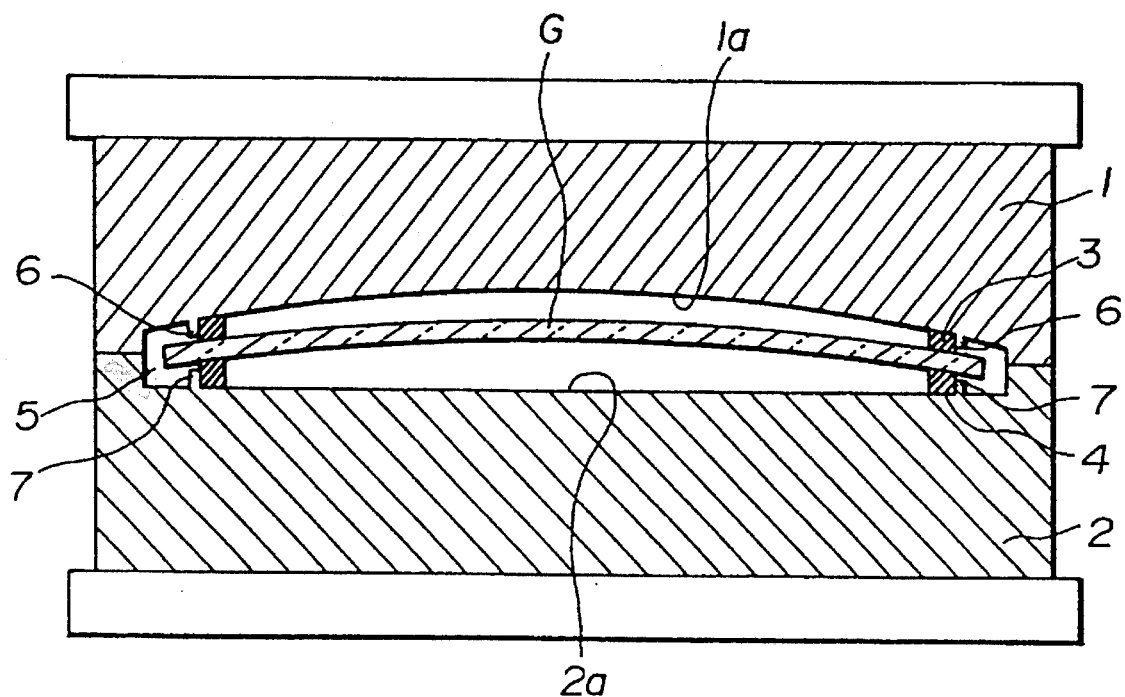
FIG. 1 is a cross-sectional view of an injection-molding apparatus according to an embodiment of the present invention.

As shown in FIG. 1, an injection-molding apparatus according to an embodiment of the present invention comprises a movable upper mold 1 and a fixed lower mold 2 which jointly houses a glass sheet G therein. The movable upper mold 1 is vertically movable toward and away from the fixed lower mold 2 which is fixed to a stationary base (not shown).

The upper and lower molds 1, 2 have recesses 1a, 2a defined in respective confronting surfaces thereof. Resilient seal members 3, 4 are mounted on bottom surfaces, respectively, of the recesses 1a, 2a along the outer edges thereof. When the upper and lower molds 1, 2 are combined with each other as shown in FIG. 1, the resilient seal members 3, 4 grip portions of the glass sheet G which are spaced slightly inwardly from the peripheral edges of the glass sheet G toward the geometric center thereof.

At this time, a mold cavity 5 is defined around the peripheral edges of the glass sheet G between the upper and lower molds 1, 2 and the seal members 3, 4. After the mold cavity 5 is established, a molten resin material such as polyvinyl chloride (PVC) or the like is injected into the mold cavity 5 to form a resin frame around the peripheral edges of the glass sheet G.

Figure 2:
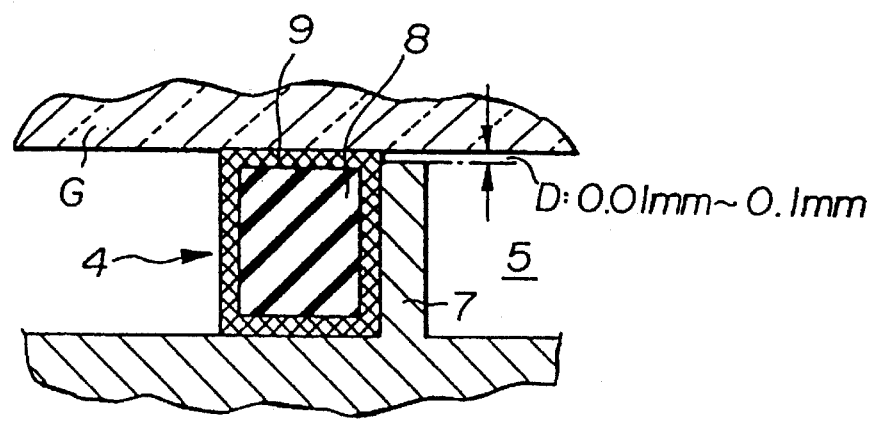
FIG. 2 is an enlarged cross-sectional view of a resilient seal member in the injection-molding apparatus shown in FIG. 1.

According to the present invention, the upper and lower molds 1, 2 have respective protective walls 6, 7 projecting toward each other, i.e., into the mold cavity 5, along the resilient seal members 3, 4. As shown in FIG. 2, the protective wall 7 is held against the side of the resilient seal member 4 which faces into the mold cavity 5. Similarly, the protective wall 6 is held against the side of the resilient seal member 3 which faces into the mold cavity 5.

The resilient seal members 3, 4 will be described below. Inasmuch as the resilient seal members 3, 4 are identical in shape to each other, only the resilient seal member 4 will be described below with reference to FIG. 2. The resilient seal member 4 is of an annular configuration extending along the peripheral edges of the glass sheet G, i.e., the outer edges of the recess 1a. The resilient seal member 4 comprises a core 8 made of a heat-resistant elastomer such as silicone rubber whose hardness ranges from 80° to 90°, and a woven or nonwoven cloth layer 9 covering all the surfaces of the core 8. The woven or nonwoven cloth layer 9 is made of heat-resistant and wear-resistant fibers such as stainless steel fibers and has a thickness in the range of from 0.5 mm to 2.0 mm.

Each of the resilient seal members 3, 4 may be made of a resilient material such as a heat-resistant elastomer in its entirety. However, in the case where the cores 8 are covered with the woven or nonwoven cloth layer 9 made of heat-resistant and wear-resistant fibers, the resilient seal members 3, 4 do not directly contact the glass sheet G and hence do not form a silicone film on the glass sheet G. The covered resilient seal members 3, 4 also sustain a desired degree of durability even when brought into contact with a molten resin material at high temperature and under high pressure.

FIGS. 3A and 3B show resilient seal members according to other embodiments of the present invention. In FIG. 3A, a resilient seal member 14 comprises a core 18 mounted on a mold 12 and a woven or nonwoven cloth layer 19 made of heat-resistant and wear-resistant fibers and mounted on only a surface of the core 18 which will be held in contact with the glass sheet G. In FIG. 3B, a resilient seal member 24 comprises an adhesive layer 10 mounted on a mold 22 and a woven or nonwoven cloth layer 29 made of heat-resistant and wear-resistant fibers and mounted on only a surface of the core 10 which will be held in contact with the glass sheet G.

As shown in FIG. 2, the protective wall 7 projects integrally from the lower mold 2 and has such a height that its distal end is spaced from the surface of the glass sheet G by a distance D ranging from 0.01 mm to 0.1 mm. If the distance D were smaller than 0.01 mm, then the glass sheet G would tend to be in direct contact with the protective wall 7 and be damaged or cracked thereby. If distance D were greater than 0.1 mm, then the molten resin material would tend to flow from the mold cavity 5 through the gap between the protective wall 7 and the glass sheet G into contact with the resilient seal member 4, lowering the durability thereof and also producing resin burrs on the glass sheet G.

The distal end of the protective wall 6 is also spaced from the surface of the glass sheet G by a distance D ranging from 0.01 mm to 0.1 mm.

The distal ends of the protective walls 6, 7 are spaced from the corresponding surfaces of the glass sheet G by the above distance D when the upper and lower molds 1, 2 are brought together with the glass sheet G therein. The distance D is small enough to prevent the molten resin material from directly contacting the resilient seal members 3, 4, which can thus have an increased service life, and is large enough to prevent the protective walls 6, 7 from contacting the glass sheet G, which can therefore be prevented from being damaged or cracked.

While the protective walls 6, 7 are integral with the respective upper and lower molds 1, 2, the protective walls 6, 7 may be separate from the respective upper and lower molds 1, 2. The resilient seal members 3, 4 may be attached to the respective upper and lower molds 1, 2 either by an adhesive or mechanically. The core 8 may be made of a synthetic resin or synthetic rubber which can form a nonsticky surface, such as fluoroplastic, fluororubber, silicone resin, silicone rubber, or the like, or cellular synthetic resin such as soft or semirigid polyurethane foam or the like, a hollow body of synthetic resin or synthetic rubber, resin-impregnated paper, or a sheet material. The woven or nonwoven cloth layer 9 may also be made of ceramic, polyimide, polyamide, Teflon, or the like, or may be replaced with a film, a sheet, or a tape.

Although there have been described what are at present considered to be the preferred embodiments of the invention, it will be understood that the invention may be embodied in other specific forms without departing from the essential characteristics thereof. The present embodiments are therefore to be considered in all respects as illustrative, and not restrictive. The scope of the invention is indicated by the appended claims rather than by the foregoing description.

What is claimed is:

1. An apparatus for injection-molding a resin frame around a peripheral edge of a glass sheet, comprising:

a pair of molds relatively movable toward and away from each other, said molds jointly defining a mold cavity when the molds are brought together, for accommodating a peripheral edge of a glass sheet therein;

a pair of resilient seal members mounted on said molds, respectively, for sealingly engaging a portion of the glass sheet which is spaced from the peripheral edge thereof; and a pair of protective walls mounted on said molds, respectively, and having respective distal ends spaced by a distance ranging from 0.01 mm to 0.1 mm from surfaces of the glass sheet when the molds are brought together.

2. An apparatus according to claim 1, wherein each of said resilient seal members comprises an elastomeric core and a heat-resistant layer mounted on at least a surface of said elastomeric core which will be in contact with the glass sheet when said molds are brought together.

3. An apparatus according to claim 2, wherein said heat-resistant layer covers all surfaces of said elastomeric core.

4. An apparatus according to claim 1, wherein each of said resilient seal members comprises an adhesive layer and a heat-resistant layer mounted on a surface of said adhesive layer which will be in contact with the glass sheet when said molds are brought together.

5. An apparatus for injection-molding a resin frame around a peripheral edge of a glass sheet, comprising:

a pair of molds relatively movable toward each other to define a mold cavity therebetween for accommodating a peripheral edge of a glass sheet therein;

a pair of resilient seal members mounted on said molds, respectively, for gripping a portion of the glass sheet which is spaced from the peripheral edge toward the geometric center of the glass sheet; and a pair of protective walls mounted on said molds, respectively, and held against surfaces of said resilient seal members which are closer to said mold cavity, said protective walls having respective distal ends spaced by a distance ranging from 0.01 mm to 0.1 mm from surfaces of the glass sheet when the molds are brought together.

6. An apparatus according to claim 5, wherein each of said resilient seal members comprises an elastomeric core and a heat-resistant layer mounted on at least a surface of said elastomeric core which will be in contact with the glass sheet when said molds are brought together.

7. An apparatus according to claim 6, wherein said heat-resistant layer covers all surfaces of said elastomeric core.

8. An apparatus according to claim 5, wherein each of said resilient seal members comprises an adhesive layer and a heat-resistant layer mounted on a surface of said adhesive layer which will be in contact with the glass sheet when said molds are brought together.

* * * * *